Feb. 21, 1933.  M. H. MATHESON  1,898,883

METHOD OF STAMPING FRONT ONE-PIECE AUTOMOBILE FENDERS

Filed July 26, 1930  4 Sheets-Sheet 1

INVENTOR.
Martin H. Matheson
BY
Parker & Burton
ATTORNEYS

Feb. 21, 1933.  M. H. MATHESON  1,898,883
METHOD OF STAMPING FRONT ONE-PIECE AUTOMOBILE FENDERS
Filed July 26, 1930   4 Sheets-Sheet 2
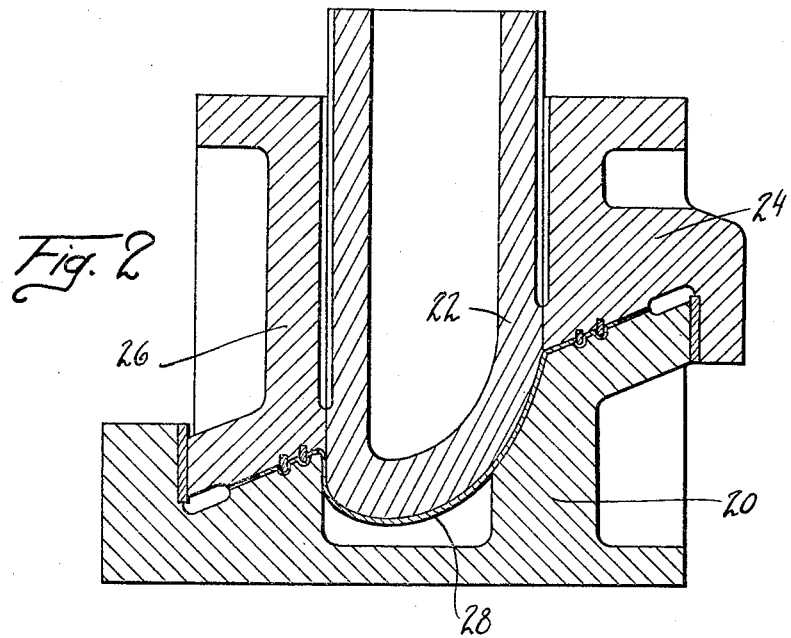
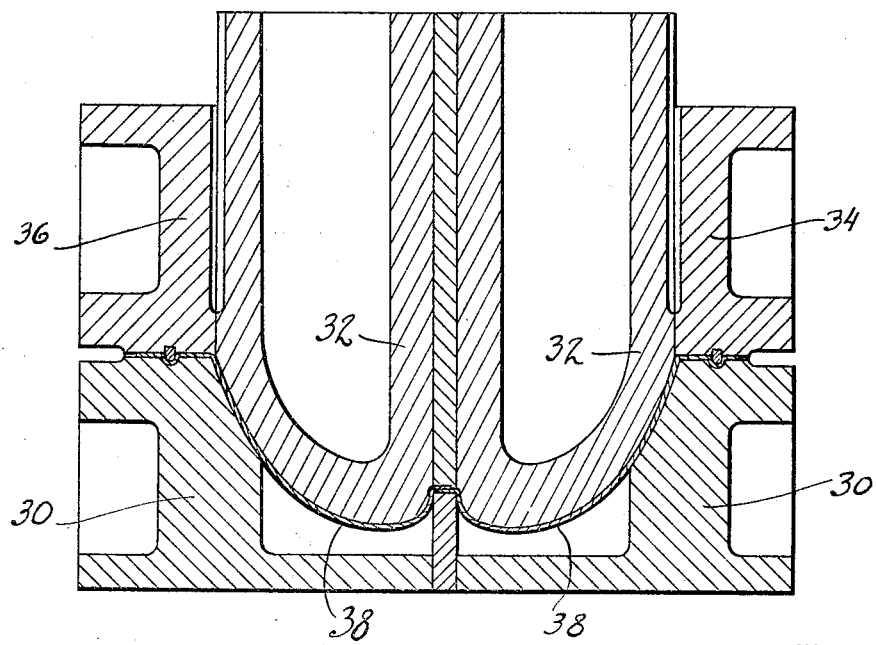
INVENTOR.
Martin H. Matheson
BY
Parker & Burton
ATTORNEYS Feb. 21, 1933. M. H. MATHESON 1,898,883
METHOD OF STAMPING FRONT ONE-PIECE AUTOMOBILE FENDERS
Filed July 26, 1930 4 Sheets-Sheet 3

INVENTOR.
Martin H. Matheson
BY
Parker & Burton
ATTORNEYS

Feb. 21, 1933.          M. H. MATHESON          1,898,883
              METHOD OF STAMPING FRONT ONE-PIECE AUTOMOBILE FENDERS
                    Filed July 26, 1930        4 Sheets-Sheet 4

INVENTOR.
Martin H. Matheson
BY
Parker & Burton
ATTORNEYS

Patented Feb. 21, 1933

1,898,883

UNITED STATES PATENT OFFICE

MARTIN H. MATHESON, OF DETROIT, MICHIGAN; UNION GUARDIAN TRUST COMPANY EXECUTOR OF SAID MARTIN H. MATHESON, DECEASED

METHOD OF STAMPING FRONT ONE-PIECE AUTOMOBILE FENDERS

Application filed July 26, 1930. Serial No. 470,917.

My invention relates to an improvement in the manufacture of front, one-piece, automobile fenders.

Heretofore it has been common practice to manufacture front fenders consisting of separately formed portions, namely, a crown portion and an apron portion, which portions were welded together to form the fender. More recently, the practice has developed in the automobile industry of forming such fenders in one piece and a number of automobile front fenders are now being so made.

The stamping of an automobile front fender in one piece, however, is attended with considerable difficulty due, among other reasons, to the unequalized stresses set up in the metal blank during the drawing operation. These unequalized stresses vary so greatly that not only is it necessary to employ sheet metal of a heavier gauge than would otherwise be required, but the percentage of defective fenders due to buckling, breakage, and other imperfections, is very high.

It is an object of my invention to provide an improved method of stamping these one piece front fenders which eliminates these disadvantages and which permits the manufacture of fenders of this type cheaply and expeditiously.

I have found that if one piece front fenders are stamped in complementary pairs, as here set forth, the stresses set up in the metal blank during the stamping operation are materially equalized as between the two longitudinal hold-down edges of the blank and that the blank is drawn uniformly to form the two fenders in the pair. Consequently the percentage of defective fenders is reduced to a minimum; the cost of the fenders in production is materially lessened; the quality of the fenders accepted as satisfactory is distinctly higher, and many other meritorious advantages will be found to result from the employment of my improved method as compared with the "one at a time" method.

In the drawings:

Fig. 2 is a vertical transverse section through stamping apparatus employed in the stamping of such a front one piece fender by the one at a time method showing the fender blank therein.

Fig. 3 is a vertical transverse section taken on the same line as Fig. 2 through stamping apparatus employed in the stamping of a similar one piece front fender according to my improved process showing the fender blank therein.

Certain of the meritorious characteristics which inhere in my improved method of manufacture may more clearly appear by contrast with the "one at a time" method of stamping these one piece front fenders.

In Fig. 2 of the drawings I have illustrated this "one at a time" method. This figure is a transverse vertical section through the stamping mechanism showing a fender blank being formed therein. The die is indicated as 20, the punch as 22, the opposite movable blank holder elements as 24 and 26, and the blank itself is indicated as 28.

It is apparent that the blank is not disposed normal to the draw line of the die. Upon one side thereof it forms an acute angle therewith and upon the opposite side it forms an obtuse angle therewith. The plane of the blank is not parallel to the bed, or bolster line, of the press and the two opposite blank holder edge portions are staggered vertically. The punch does not draw the metal uniformly from the hold down edges but on the contrary there is a wide difference in this draw. The resulting stresses set up in the blank vary widely. There is also a tendency for the punch to be urged sideways. It will be noted that each upper blank holder member has lateral bearing engagement with the corresponding lower blank holder member to prevent this side movement. Fig. 2 is a showing of a conventional construction used in the trade.

In Fig. 3 which illustrates stamping mechanism in a position similar to that shown in Fig. 2 but adapted for employment of my improved process, the lower double die member is indicated as 30, the movable double punch as 32, the opposed upper blank holder elements as 34 and 36, and the metal blank itself as 38. In this view it will appear that the blank rests squarely upon the die; that the opposite blank holder edge portions thereof are disposed in the same horizontal plane which plane is normal to the line of draw of the punch; that the punch draws uniformly from both held edges of the blank; that the blank tends to center the punch with respect to the die; and that the stresses set up in the blank will be substantially uniform.

The result of this uniform drawing of the metal and equalized distribution of the stresses set up therein is that the double fender stampings which form the intermediate product in the manufacture of complete one piece front fenders come out of the press substantially free from defect such as buckling, warping, or rupture, and that the percentage of "rejects" is reduced to a minimum.

Figure 1:
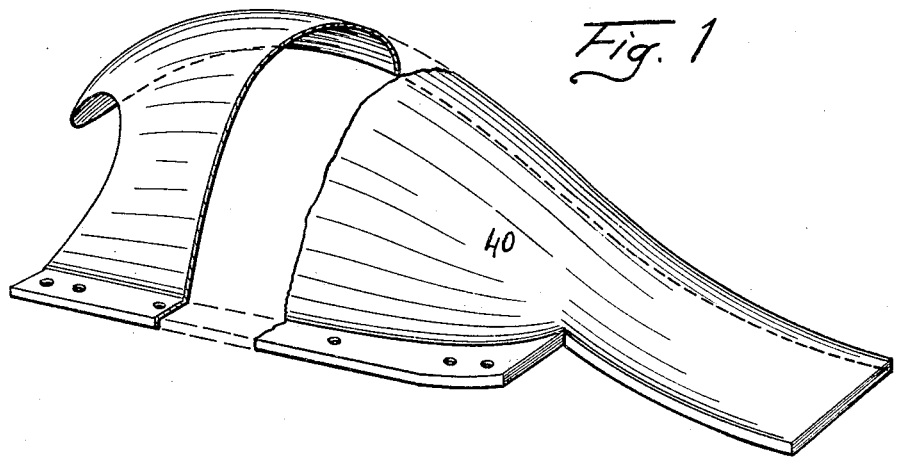
Fig. 1 is a perspective partly broken away of a complete conventional one piece front fender for an automobile.
Figure 4:
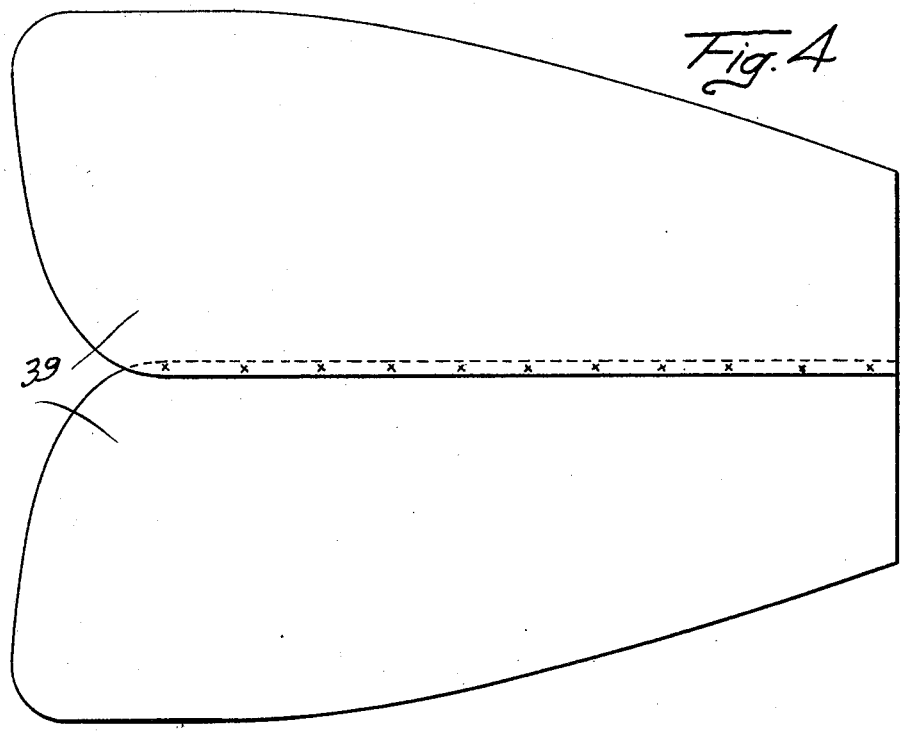
Fig. 4 is a plan of a sheet metal blank suitable for use in stamping front one piece fenders according to my improved method.

The several figures in the drawings illustrate the various steps in my improvement in the process of manufacturing front one piece automobile fenders. Fig. 1 illustrates the shape and contour, as nearly as the same can be shown, of such a fender in the complete form. Fig. 3 has been described. Fig. 4 is a plan of the blank 39 suitable for stamping according to my improved method. The blank here shown is formed of two pieces of strip sheet steel welded together along the linear median line.

Figure 5:
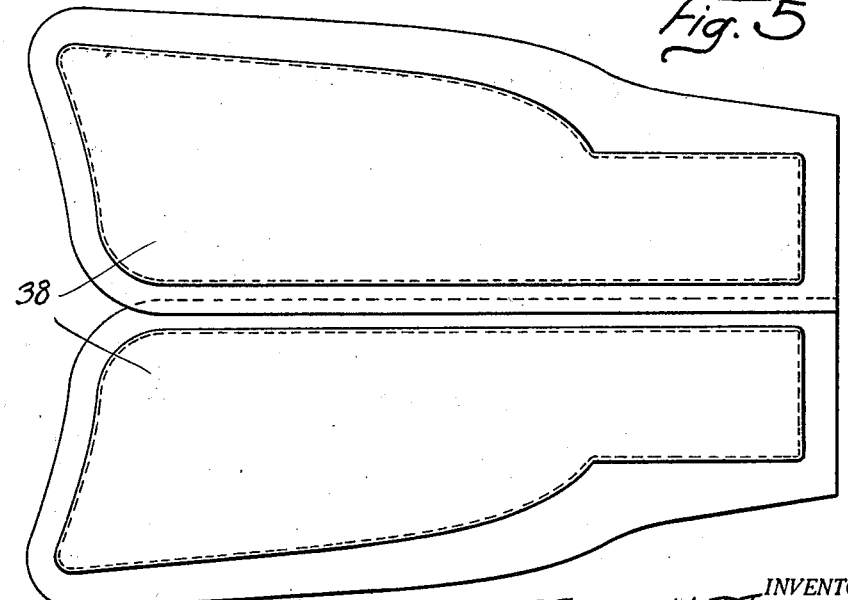
Fig. 5 is a plan of the same blank following the stamping operation illustrated in Fig. 3.

This blank is placed in the press flat upon the die member 30. At the beginning of the stamping operation the blank holder elements 34 and 36 descend to hold the blank toward the member 30. There is, of course, a drawing in from the edges under the downward movement of the punch as is well understood in stamping operations. Punch 32 in its descent follows the downward movement of the blank holder elements 34 and 36 and draws the metal of the blank uniformly from both hold edges. The punch is centered in its descent by the blank itself. The blank is shaped as shown in Figs. 3 and 5. It is the formation of this intermediate product in the manufacture of one piece front fenders with which my invention is primarily concerned.

Figure 6:
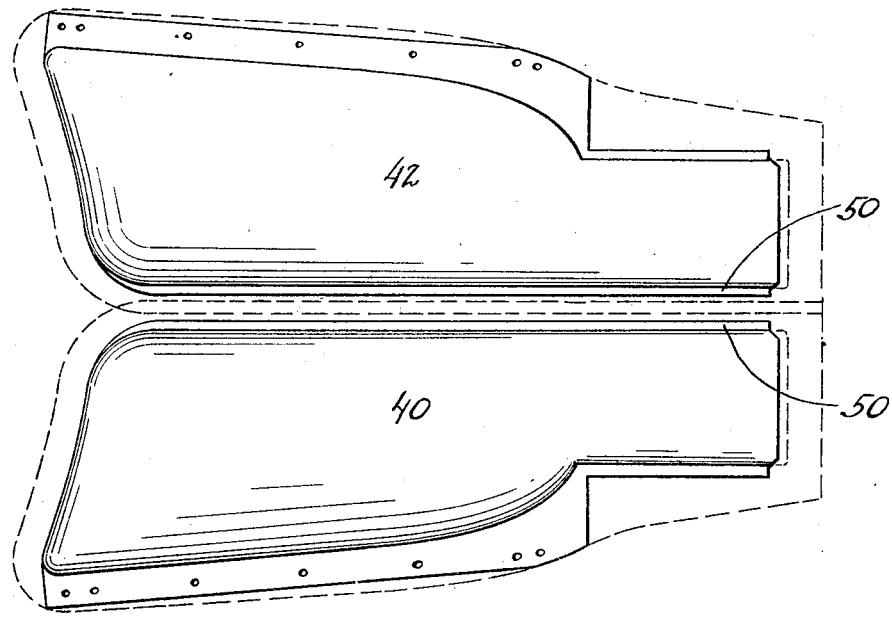
Fig. 6 is a plan of this same intermediate product, shown in Fig. 5, with the portions which are trimmed away delimited in dotted outline.

This intermediate product, shown in Fig. 5, is then trimmed and split apart and a pair of complementary front one piece fenders, each comprising a crown portion formed integrally with an apron portion, is the result. Fig. 6 shows these two fenders, a right fender 40 and a left fender 42, in solid line while in dotted outline is shown that portion which is cut away to form these two fenders.

Figure 7:
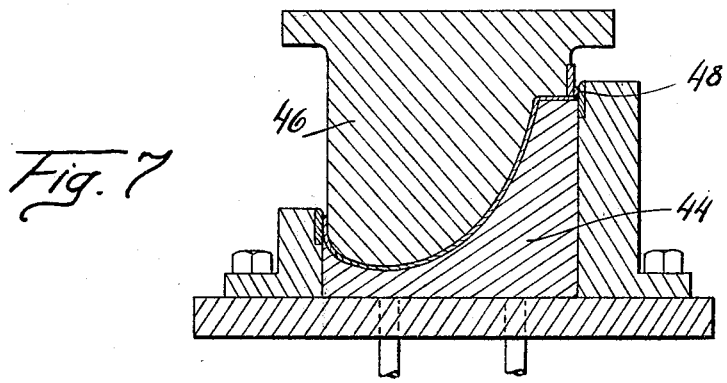
Fig. 7 illustrates a subsequent step in the shaping of one of the individual fenders.

The next step in the process here shown is the shaping operation illustrated in Fig. 7 wherein these fenders are individually placed in a die 44 and a punch 46 comes down and shapes the same against the die. The edges are not held down during this operation. One edge portion is turned upwardly as at 48 to form a flange, and the opposite edge portion, which is formed from the intermediate portion of the blank and which in my double stamping method is not drawn sufficiently deep to form the complete depth or contour necessary for the crown portion, is wiped upwardly giving the crown portion the required depth or contour for the complete fender. The outer edge portion of the fender may, if desired, be rolled over and the frame engaging portion of the stamping may be perforated for attachment to the frame if this has not previously been done.

In addition to the advantages heretofore mentioned of uniform draw and equalized distribution of the stresses throughout the blank when stamping according to my improved method, it also appears that, if compared with the "one at a time" method the depth of draw in the blank itself to form the outer edge portion of the crown of the fender, is substantially less than that required in the "one at a time" method because of the fact that the intermediate portion of each fender adjacent the edge where the two fenders of the pair are split apart as shown in Fig. 6, and which intermediate portion is there indicated in solid line as 50, is wiped upwardly as shown in Fig. 7 in the operation there indicated and to that extent it is not necessary to originally draw the fender blank.

Furthermore, in the "one at a time" method of stamping these fenders it has been found necessary to draw the outer crown portion of the fender to a depth greater than that required to form the contour of the crown, because of the resulting weakness and breakage at this sharp draw angle, in such method, and this excess portion is thereafter cut off and thrown away.

Figure 8:
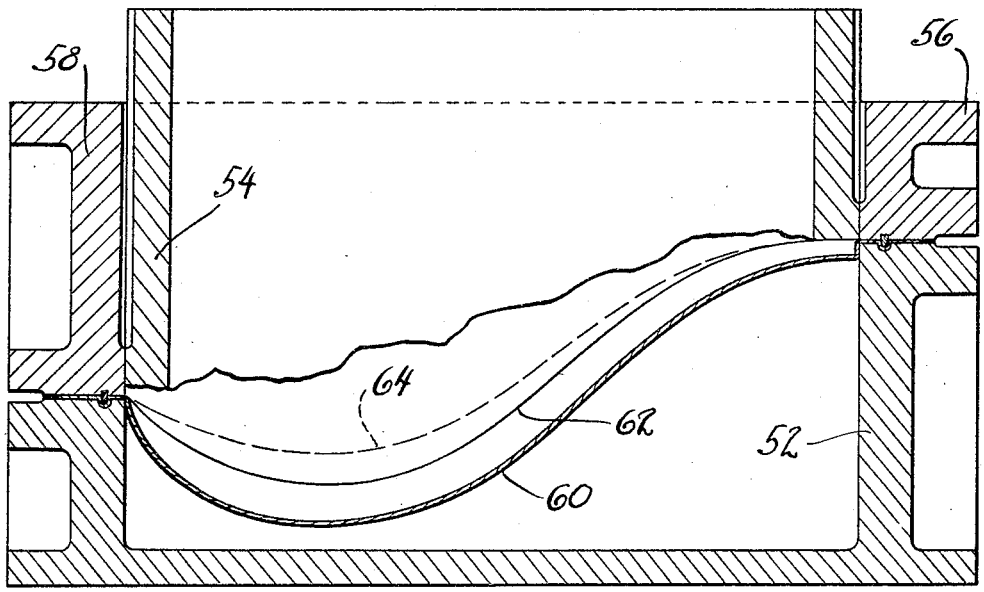
Fig. 8 is a longitudinal section through a fender of this type arranged in the press and during the stamping operation and illustrating in comparative lines the different distances of draw in the "one at a time" and in my improved method.

This variation in depth of draw in the two methods is illustrated diagrammatically in Fig. 8. The die member is indicated as 52 in this figure and the punch element as 54, and the hold down elements as 56 and 58, while the blank itself is indicated as 60. This is a longitudinal sectional view. The solid curved line immediately above the blank line 60 and indicated as 62 represents the median line of the die in my double method from which the draw is made. The dotted curved line 64 immediately above the line 62 indicates the corresponding draw line according to the "one at a time" method and the diagram illustrates comparatively considerable increase in the extent of draw required in this "one at a time" method as compared with my improved method.

In addition to the characteristics above set forth as inherent in my improved process, it appears that there is considerable advantage in labor saved and in saving of material. Less material is required not only because of the substantial reduction in breakage, but more particularly because only two hold down edge portions are wasted for each pair of fenders while in the "one at a time" method two hold down edge portions are wasted for each fender. Due to the absence of unequalized stress on the metal blank, the strain on the press itself is equalized and there is less wear and tear on the stamping apparatus. Due to the uniformity of the draw and equalization of the stresses set up in the metal blank, it is possible to more accurately control the blank holder pressure and to effect a more accurate ratio of draw and slippage in the stamping operation.

What I claim is:

1. That method of forming a front one piece automobile fender having a crown portion integral with an apron portion which includes stamping the same in complementary pairs from a sheet metal blank held during the stamping operation along opposite edges arranged in substantially the same horizontal plane to form corresponding apron portions adjacent the held edges and corresponding crown portions adjacent and on opposite sides of the intermediate linear line of the blank, and normal to the line of draw of the stamping operation whereby the metal draw is equalized throughout the entire blank during the stamping operation.

2. That method of forming a front one piece automobile fender having a crown portion integral with an apron portion which includes stamping the same in complementary pairs from a sheet metal blank held during the stamping operation along opposite edges arranged in substantially the same horizontal plane and sloping away from each held edge to form corresponding apron portions adjacent the held edges and corresponding crown portions within the intermediate portion of the blank so that an intermediate portion of the blank forms an outer edge of the crown of each fender in the pair.

3. That method of forming a front one piece automobile fender having a crown portion integral with an apron portion which comprises securing two sheet metal blanks together forming a unitary sheet metal blank with the jointure line extending lengthwise thereof midway between its longitudinal edges, and stamping said unitary sheet metal blank to form therefrom at one operation a complementary pair of said front one piece fenders each having a crown portion integral with an apron portion and with the jointure line of said united blank arranged between said fenders so that one fender is formed from one portion of the blank and the other fender is formed from the other portion.

4. That method of forming a front one piece automobile fender having a crown portion integral with the apron portion thereof which includes stamping the same in complementary pairs from a sheet metal blank held during the stamping operation along opposite edges arranged in substantially the same horizontal plane and normal to the line of draw of the stamping operation, and arranging the respective dies for said complementary fenders in such manner that the deeper draw portions are positioned adjacent one another along a line intermediate the held edges of the blank.

5. A method of forming a front one piece automobile fender having a crown portion integral with an apron portion which includes the steps of positioning a sheet metal blank upon a die along opposite edges thereof, and forming complementary fenders upon each side of a median line extending through the blank parallel to the held edges by means of a complementary die upon which the deeper draw sections are positioned adjacent said median line and spaced slightly therefrom to provide a flange portion substantially parallel to the held edges extending along and coincident with the adjacent edges of the complementary fenders.

6. That method of forming a front one piece automobile fender having a crown portion integral with an apron portion which includes the steps of positioning a metal blank along opposite edges thereof upon a die, the held portion of said edges being substantially normal to the direction of draw of the die assembly, stamping said blank with a complementary die to produce adjacent continuous arcuate sheets extending from the held edges to a line substantially intermediate said edges, the draw of the arcs so formed being deepest adjacent said intermediate line.

7. That method of forming a front one piece automobile fender having a crown portion integral with an apron portion which includes the steps of positioning a metal blank along opposite edges thereof upon a die, the held portion of said edges being substantially normal to the direction of draw of the die assembly, stamping said blank with a complementary die to produce adjacent continuous arcuate sheets extending from the held edges to a line substantially intermediate said edges, the draw of the arcs so formed being deepest adjacent said intermediate line, the intermediate line associated with each complementary arc being spaced slightly from the other and parallel thereto.

8. That method of forming a front one piece automobile fender having a crown portion integral with an apron portion which includes the steps of positioning a metal blank along opposite edges thereof upon a die, the held portion of said edges being substantially normal to the direction of draw of the die assembly, stamping said blank with a complementary die to produce adjacent continuous arcuate sheets extending from the held edges to a line substantially intermediate said edges, the draw of the arcs so formed being deepest adjacent said intermediate line, the intermediate line associated with each complementary arc being spaced slightly from the other and parallel thereto, severing said formed blank substantially midway between said intermediate lines, and bending the flange so formed so that it constitutes a continuation of the stamped arc.

9. That method of forming a front one piece automobile fender having a crown portion integral with an apron portion which includes stamping the same in complementary pairs from a sheet metal blank held during the stamping operation along opposite edges arranged in substantially the same horizontal plane so that the deeper draw portions of the stamped blank adapted to form the outer crown of each respective fender lie intermediate the held edges and adjacent one another.

In testimony whereof, I, MARTIN H. MATHESON, sign this specification.

MARTIN H. MATHESON.